United States Patent
Chin et al.

(10) Patent No.: US 8,089,894 B2
(45) Date of Patent: Jan. 3, 2012

(54) METHODS AND SYSTEMS FOR ADAPTIVE EFFECTIVE CINR REPORTING IN A WIRELESS COMMUNICATION SYSTEM

(75) Inventors: Tom Chin, San Diego, CA (US); Kuo-Chun Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 172 days.

(21) Appl. No.: 12/123,397

(22) Filed: May 19, 2008

(65) Prior Publication Data

US 2009/0285109 A1    Nov. 19, 2009

(51) Int. Cl.
*H04L 12/26* (2006.01)

(52) U.S. Cl. .................. 370/252; 370/208

(58) Field of Classification Search .......... 370/203–210, 370/242–253
See application file for complete search history.

(56) References Cited

U.S. PATENT DOCUMENTS

| | | |
|---|---|---|
| 7,197,281 B2 | 3/2007 | Pietraski et al. |
| 7,280,504 B2 | 10/2007 | Sato |
| 7,489,652 B2 | 2/2009 | Kwon et al. |
| 7,542,421 B2 | 6/2009 | Srikrishna et al. |
| 2003/0090993 A1* | 5/2003 | Sato ............... 370/203 |
| 2004/0266358 A1 | 12/2004 | Pietraski et al. |
| 2005/0160181 A1* | 7/2005 | Kwon et al. .......... 709/238 |
| 2005/0282500 A1 | 12/2005 | Wang et al. |
| 2007/0058603 A1* | 3/2007 | Song et al. .......... 370/342 |
| 2007/0060064 A1* | 3/2007 | Srikrishna et al. ...... 455/67.11 |
| 2008/0159192 A1 | 7/2008 | Lee et al. |
| 2008/0317014 A1* | 12/2008 | Veselinovic et al. ...... 370/380 |
| 2009/0086855 A1* | 4/2009 | Jin et al. .......... 375/341 |
| 2009/0141673 A1* | 6/2009 | Hwang et al. .......... 370/328 |
| 2009/0262653 A1* | 10/2009 | Toda et al. .......... 370/252 |

FOREIGN PATENT DOCUMENTS

WO    WO2005/006568    *    1/2005

OTHER PUBLICATIONS

International Search Report and the Written Opiniony—PCT/US2009/043555, International Search Authority—European Patent Office—Aug. 18, 2009.

* cited by examiner

*Primary Examiner* — Gary Mui
(74) *Attorney, Agent, or Firm* — Charles Chesney

(57) ABSTRACT

Embodiments of the present disclosure allow a MS to dynamically adjust the mapping of a physical CINR measurement to an effective CINR. For some embodiments, an effective CINR value may be generated based on a physical CINR value and a measured packet error rate (PER) over one or more time periods. By dynamically adjusting the effective CINR reported back to a BS, the MS may allow the BS to select a coding scheme that effectively compensates for changes in channel conditions, which may improve system performance.

28 Claims, 9 Drawing Sheets

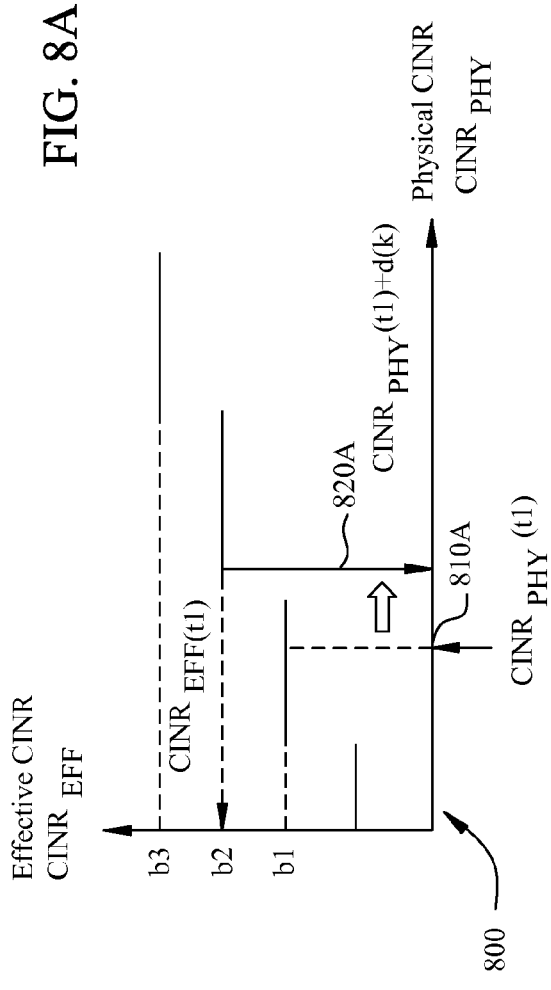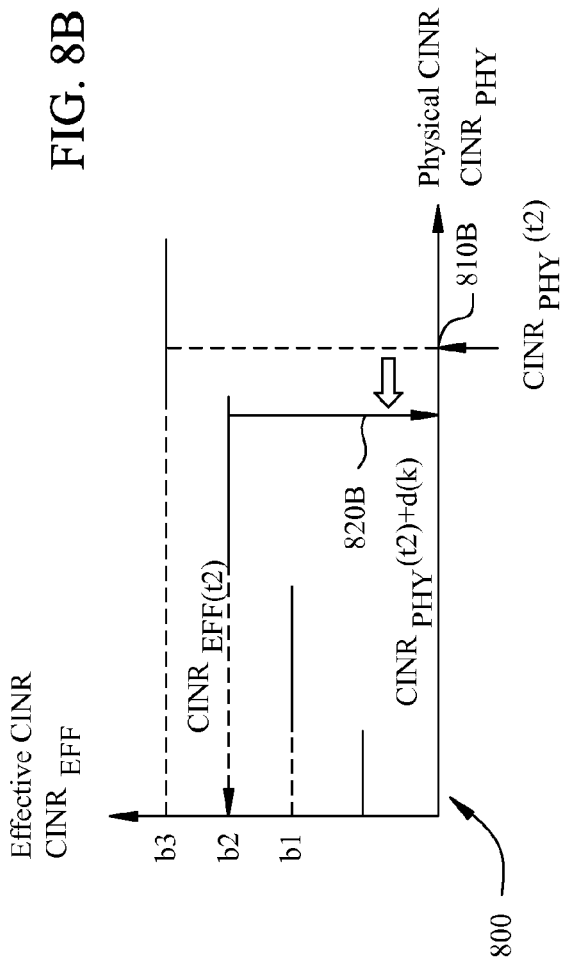

METHODS AND SYSTEMS FOR ADAPTIVE EFFECTIVE CINR REPORTING IN A WIRELESS COMMUNICATION SYSTEM

TECHNICAL FIELD

Certain embodiments of the present disclosure generally relate to wireless communication and, more particularly, to the measuring and reporting of signal quality information by a mobile station.

BACKGROUND

OFDM and OFDMA wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations (MS).

Under the current versions of the IEEE 802.16 standard for the OFDMA systems, the MS may be required to report a variety of channel quality information (CQI) back to the BS. For example, the MS may be required to report an effective carrier-to-interference plus noise ratio (CINR) back to the BS. In conventional systems, a MS generates the effective CINR value by utilizing a physical CINR measurement as an index into a mapping table. The effective CINR values of the mapping table are typically calculated in an effort to compensate for expected channel conditions and are typically fixed during manufacture of the MS. The BS receives effective CINR values reported by the MS and selects a coding scheme corresponding to the effective CINR value for encoding and modulating subsequent downlink (DL) data bursts to the MS.

Unfortunately, as channel conditions change, the effective CINR values generated using the fixed mapping table may result in the selection of sub-optimal coding schemes. Despite extensive testing, it is very difficult to optimize a mapping table such that it addresses the variety of field conditions an MS may encounter. Updating a mapping table in an MS is not feasible as, unlike with a BS, there is no simple upgrade method available due to the sheer volume of units.

SUMMARY

Embodiments of the present disclosure allow a MS to dynamically adjust the mapping of a physical CINR measurement to an effective CINR. For some embodiments, an effective CINR value may be generated based on a physical CINR value and a measured packet error rate (PER) over one or more time periods. By dynamically adjusting the effective CINR reported back to a BS, the MS may allow the BS to select a coding scheme that effectively compensates for changes in channel conditions, which may improve system performance.

Certain embodiments of the present disclosure provide a mobile device for wireless communication configured to dynamically adjust an effective CINR reported back to a base station. The mobile device generally includes logic for generating a packet error rate measurement based on a total number of received packets and a number of successfully received packets over one or more time periods, logic for taking a physical CINR measurement, logic for generating an effective CINR value as a function of the physical CINR measurement and the packet error rate measurement, and logic for reporting the effective CINR value back to a serving base station.

Certain embodiments of the present disclosure provide an apparatus for wireless communication configured to dynamically adjust an effective CINR reported back to a base station. The apparatus generally includes a means for decoding received signals and extracting a set of received packets, a means for generating a packet error rate measurement based on a total number of received packets and a number of successfully received packets over one or more time periods, a means for taking a physical CINR measurement, a means for generating an effective CINR value as a function of the physical CINR measurement and the packet error rate measurement, and a means for reporting the effective CINR value back to a serving base station.

Certain embodiments of the present disclosure further provides a computer readable storage medium containing a program which, when executed by a processor, performs a set of operations. The set of operations generally include generating a packet error rate measurement based on a total number of received packets and a number of successfully received packets over one or more time periods, taking a physical CINR measurement, generating an effective CINR value as a function of the physical CINR measurement and the packet error rate measurement, and reporting the effective CINR value back to a serving base station.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 8A and 8B illustrate example adjustments in the mapping of physical CINR to effective CINR corresponding to the examples shown in FIGS. 7A and 7B.

DETAILED DESCRIPTION

Figure 1:
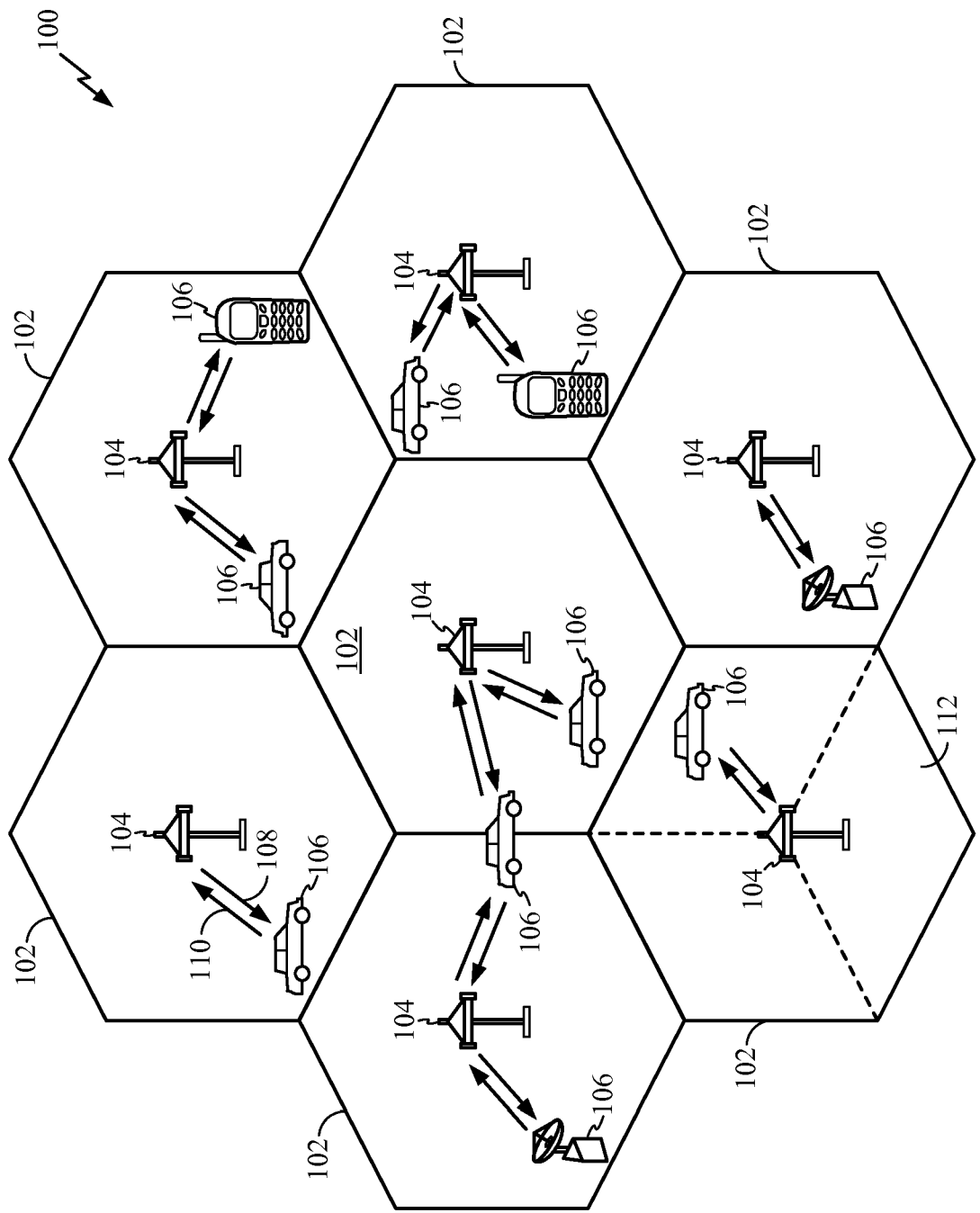
FIG. 1 illustrates an example wireless communication system, in accordance with certain embodiments of the present disclosure.

Embodiments of the present disclosure allow a MS to dynamically adjust the mapping of a physical CINR measurement to an effective CINR. For some embodiments, an effective CINR value may be generated based on a physical CINR value and a measured packet error rate (PER) over one or more time periods. By dynamically adjusting the effective CINR reported back to a BS, the MS may allow the BS to select a coding scheme that effectively compensates for changes in channel conditions, which may improve system performance.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility and strong multipath immunity over conventional single carrier modulation schemes.

IEEE 802.16x is an emerging standard organization to define an air interface for fixed and mobile broadband wireless access (BWA) systems. These standards defined at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
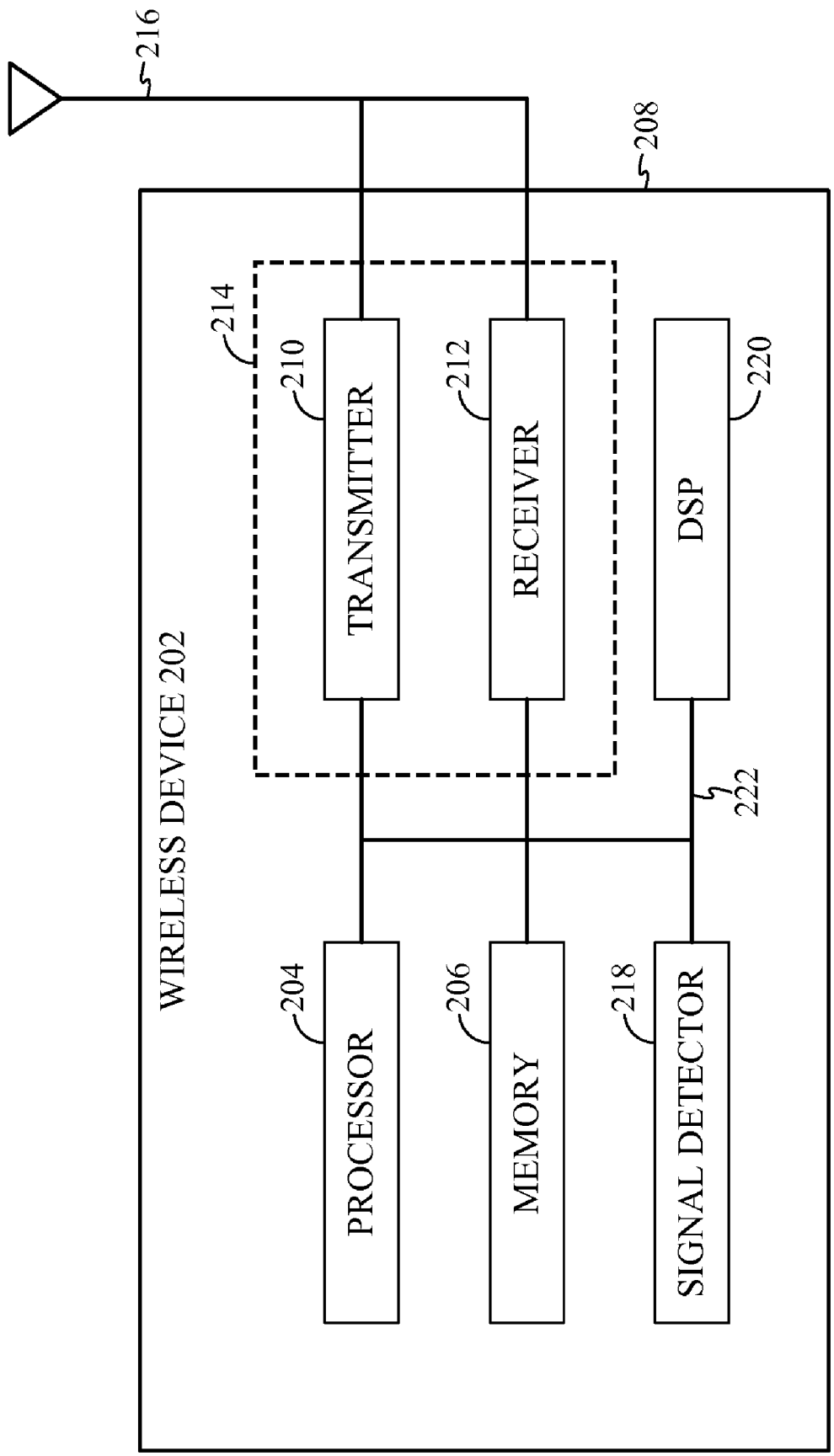
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per subcarrier per symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
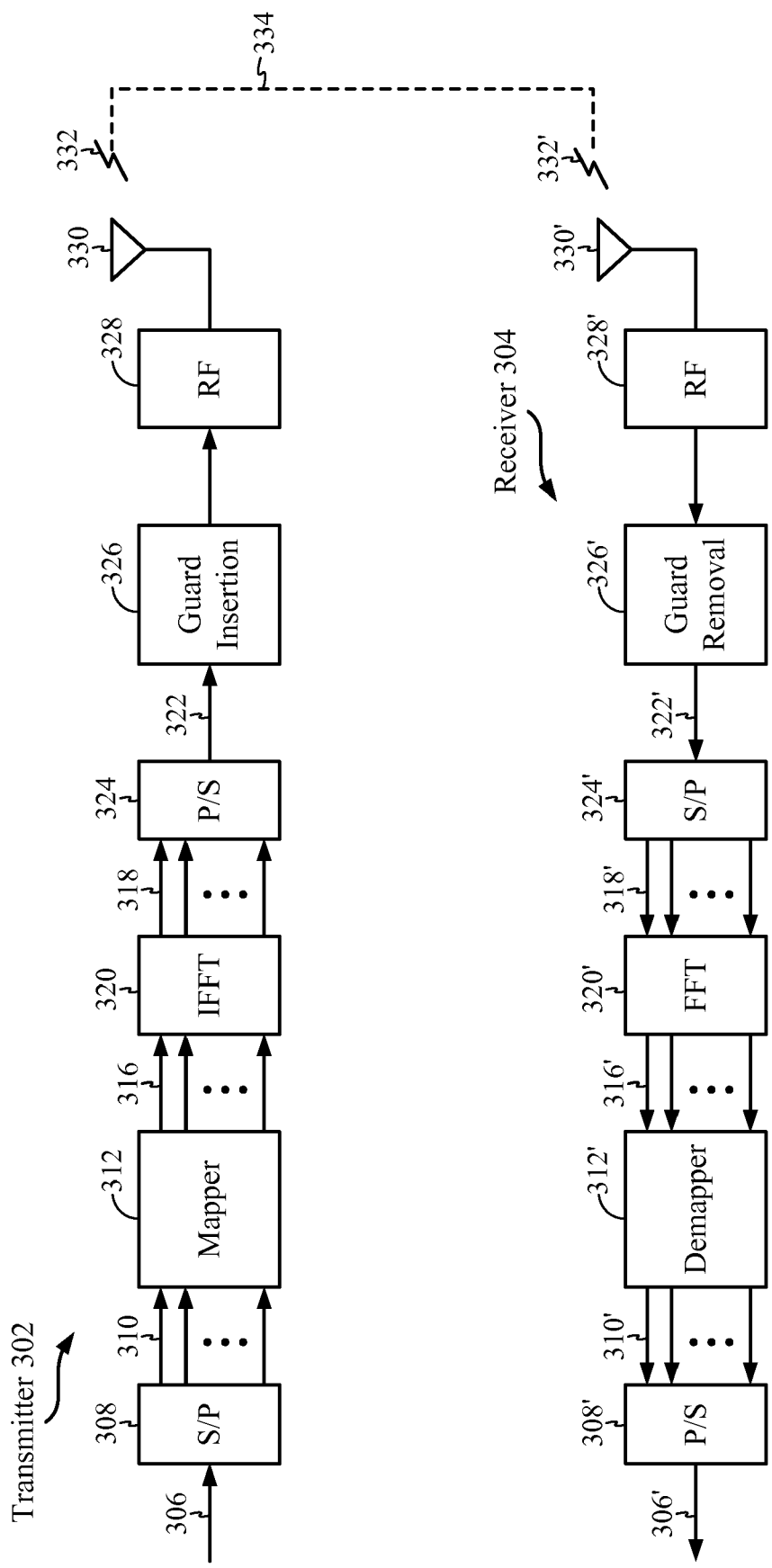
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8 PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Dynamically Adjusting Physical to Effective CINR Mapping

As a BS communicates with a MS, the signal quality of transmissions between the two may vary due to changing channel conditions. These changes in channel conditions may include caused, for example, by movement of the MS, and may include variations in interference, or variations in noise. To allow the BS to adjust transmission schemes in an effort to compensate for variations in signal quality, the MS may report a variety of channel quality information (CQI) measurements back to the BS For example, according to versions of the IEEE 802.16 standard, the MS may be required to report an effective carrier-to-interference plus noise ratio (CINR) back to the BS.

While in conventional systems, an MS typically generates an effective CINR based on physical CINR measurements using a fixed mapping table, techniques presented herein allow physical to effective CINR mapping to be dynamically adjusted, which may help account for changing channel conditions.

One of the challenges in mapping a physical CINR measurement to an effective CINR is to find a balance between an increased data rate and a decreased packet error rate. In other words, by reporting a particular effective CINR value back to a BS, the MS may be viewed as effectively requesting that the BS use a corresponding modulation scheme. In general, reporting a higher effective CINR will result in the BS using a modulation scheme that results in a higher data rate. Unfortunately, conventional fixed mappings may be based on assumptions that do not accurately reflect current changes in channel conditions. Therefore, a BS receiving an effective CINR value based on a fixed mapping may select a coding scheme that results in a data rate that is less than optimal or a packet error rate that is higher than desired.

Embodiments of the present disclosure may help address this challenge by enabling a MS to dynamically adjust the mapping of a physical CINR to an effective CINR. This dynamic adjusting may take into consideration a difference between a measured packet error rate and a target packet error rate. If the measured packet error rate (PER) is below the target, the MS may dynamically adjust the mapping to generate a higher effective CINR value to report back to the BS, in an effort to increase data rate. On the other hand, if the PER exceeds the target, the MS may dynamically adjust the mapping to generate a lower effective CINR to report back to the BS in an effort to reduce the data rate.

Thus, embodiments of the present disclosure may help improve overall system performance by dynamically adjusting the mapping of a physical CINR to an effective CINR in order to compensate for varying field conditions.

Figure 4:
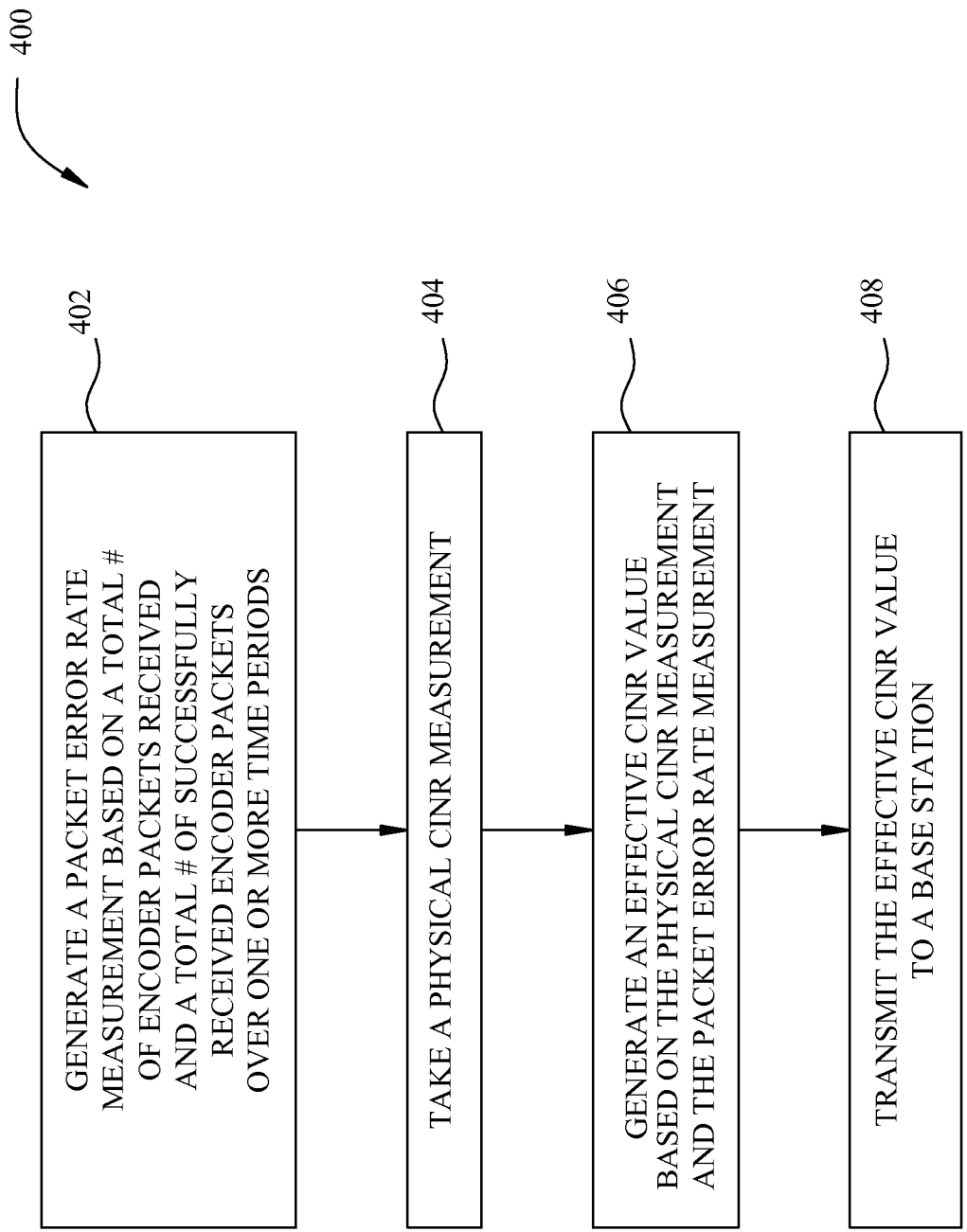
FIG. 4 illustrates example operations that may be performed to generate and report an effective CINR value, in accordance with embodiments of the present disclosure.

FIG. 4 illustrates example operations 400 that may be performed at an MS in order to generate and report back an effective CINR value, in accordance with embodiments of the present disclosure. The operations 400 may be described with reference to the example receiver components illustrated in FIG. 5.

The operations 400 begin, at 402, by generating a packet error rate (PER) measurement. Exactly how the logic 520 generates the PER may vary with different implementations and may depend on the particular transmission scheme. For example, for HARQ transmissions, each encoder packet may be transmitted in multiple subpacket transmissions. However, the MS may be configured to count multiple subpacket transmissions as a single encoder packet when calculating a PER measurement. Because each encoder packet is transmitted only once for non-HARQ transmissions, the MS may count each transmissions as a single encoder packet when calculating a PER measurement.

At 404, the MS takes a physical CINR measurement. As described above, the MS may receive an OFDMA signal transmitted from a BS and downconvert and transform the signal into the frequency domain as described above. The MS may include CINR measurement logic 520 configured to take a physical CINR measurement of the frequency domain signal. The logic 520 may take a CINR measurement, for example, based on an estimated channel or an error vector measurement (EVM) using constellation demapping.

Figure 5:
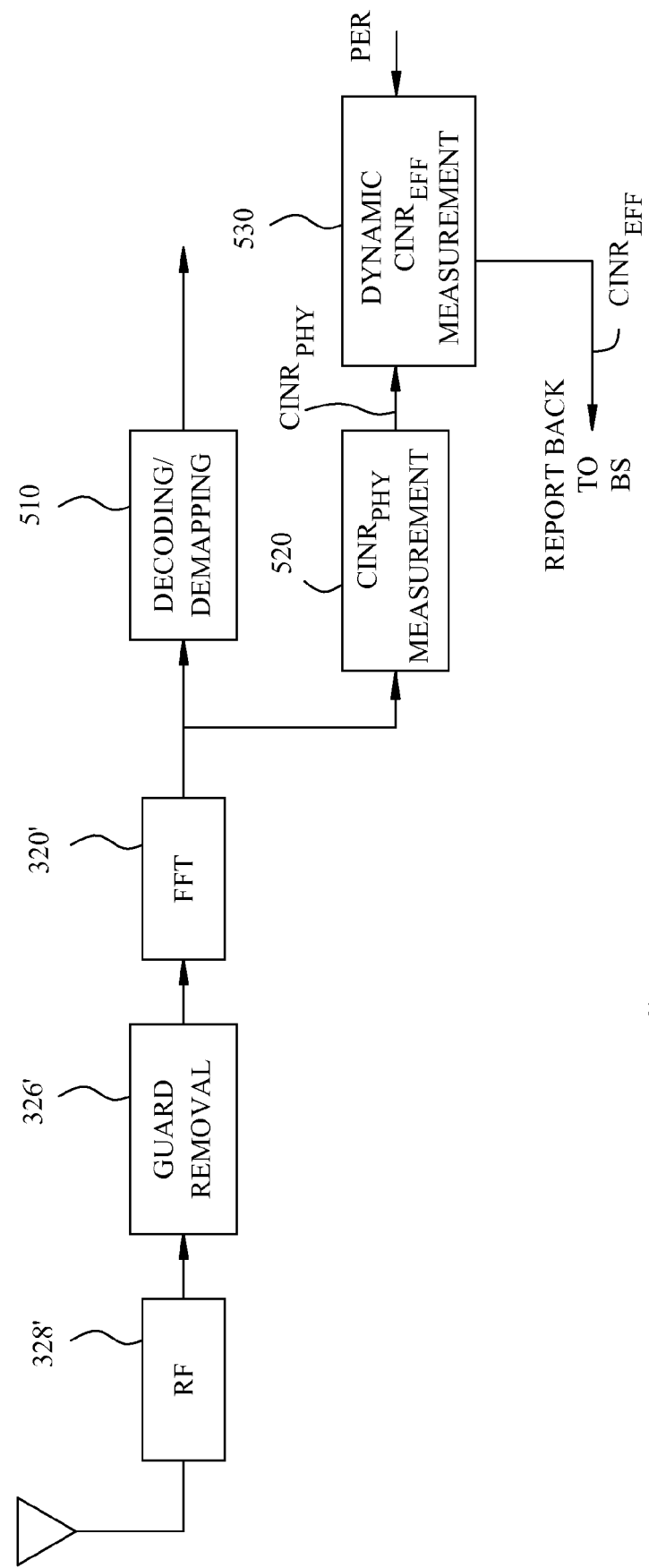
FIG. 5 illustrates example logic for generating an effective CINR based on the physical CINR and packet error rate, in accordance with embodiments of the present disclosure.

At 406, an effective CINR value may be generated based on the physical CINR measurement and PER measurement. At 408, the effective CINR value may be transmitted back to the BS, using a fast-feedback channel between the MS and the BS. As illustrated in FIG. 5, the MS may include dynamic effective CINR measurement logic 530 that generates an effective CINR value based on the physical CINR measurement and the PER measurement.

Conventional mapping of a physical CINR measurement ($CINR_{PHY}$) to an effective CINR value ($CINR_{EFF}$) may generally be described by the direct mapping function shown in Equation 1:

$$CINR_{EFF} = f(CINR_{PHY}) \quad (1)$$

which is often a piece-wise function, with ranges of physical CINR measurements mapped to a discrete number of effective CINR values. The dynamic mapping presented herein may also take into account measured PER and may, thus, be described by the mapping function shown in Equation 2:

$$CINR_{EFF} = f(CINR_{PHY}, PER) \quad (2)$$

As will be described in greater detail below, PER measurements averaged over one or more time periods may be used to dynamically adjust physical to effective CINR mapping. In some cases, adjustments to mappings may be made in a weighted manner, for example, with less weight given to older PER measurements.

For some embodiments, in an effort to maintain an optimal balance between data rate and PER, effective CINR mapping may be dynamically adjusted in an effort to maintain the measured PER at or near a target level. For example, as will be described in greater detail below, dynamic CINR measurement logic 530 may be configured to compare the PER measurement to a target PER value and an adjustment value may be calculated based on the comparison. The adjustment value may be used to effectively adjust (increase or decrease) the physical CINR measurement to achieve a corresponding increase or decrease in effective CINR. As described above, this adjusted CINR value may be transmitted to the BS in an effort to select a corresponding modulation scheme that should result in a corresponding increase or decrease in data rate.

Exemplary Mapping Algorithm Based on an Average PER

For some embodiments, in an effort to maintain the PER at or near a target PER and avoid the selection of modulation schemes by the BS that would result in large fluctuations in data rate, effective CINR mapping may be adjusted based on some form of averaging or weighting of PER measurements taken over one or more time periods. PER measurements may be averaged over a sample period or multiple sample periods. Further, by incrementing/decrementing an adjustment value with constant but different step sizes, as described in greater detail below, some amount of dampening may be built in to the calculations, which may help avoid rapid fluctuations in requested rates and packet error rates.

Figure 6:
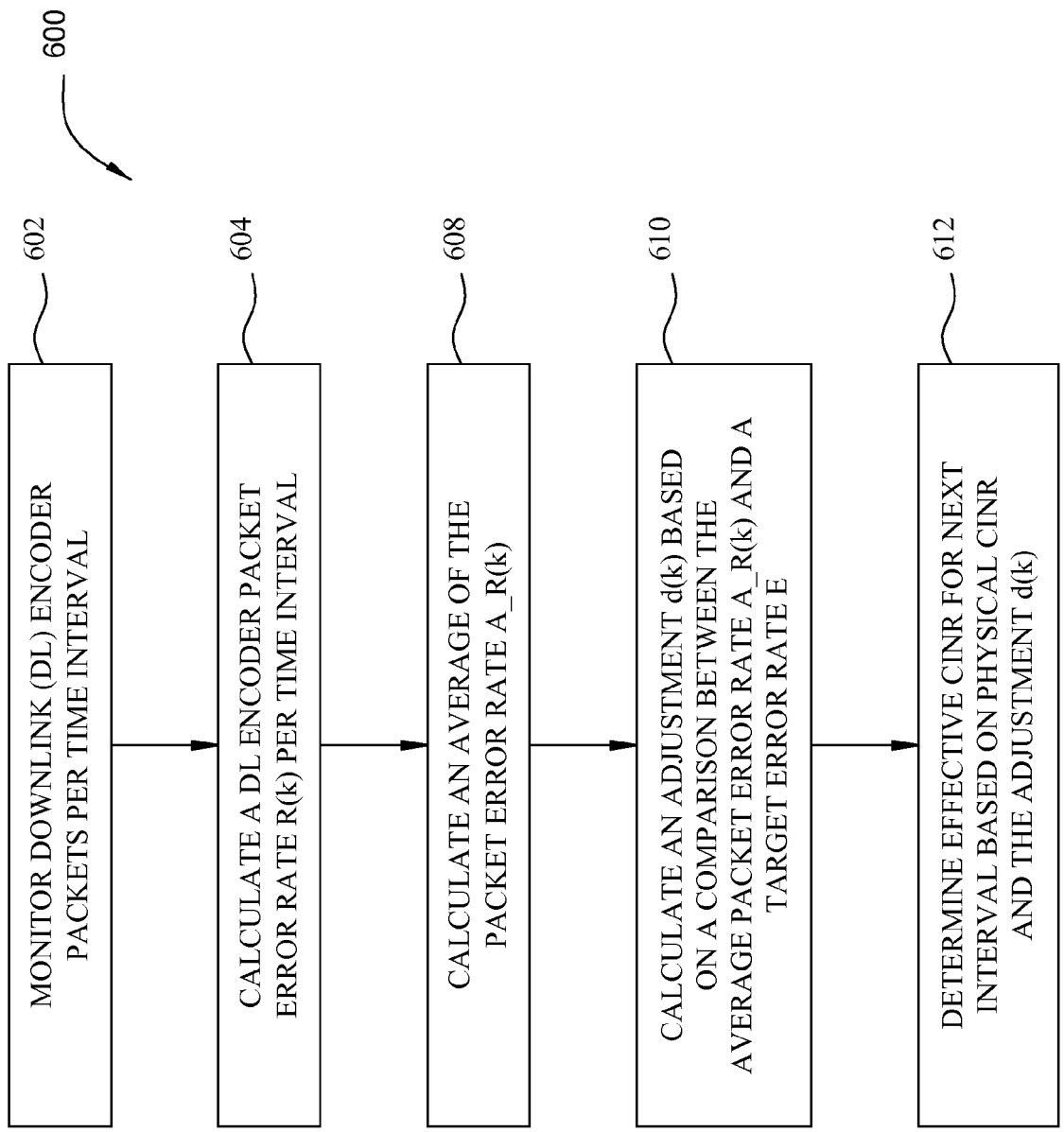
FIG. 6 illustrates example operations for dynamically adjusting the mapping of a physical CINR to an effective CINR, in accordance with embodiments of the present disclosure.

FIG. 6 illustrates example operations 600 for calculating an effective CINR based on the physical CINR and a corresponding PER value, according to one embodiment of the present disclosure. As described above, exponential averaging may be used to lower the weight given to older statistics.

The operations 600 begin, at 602, by monitoring DL packets for a given time interval. At 606, a PER per time interval is calculated. For example, logic within the MS may monitor the received DL encoder packets over a time interval, for example, between $(k-1)*T$ and $k*T$, where T is a time interval per iteration and corresponds to a multiple of WiMAX frames. To calculate PER, the logic may maintain a first count $N(k)$ to track the total number of DL encoder packets received, while a second counter $N\_S(k)$ tracks the total number of successfully received DL encoder packets, where k is the number of iterations (e.g., k=1, 2, 3, . . . ). PER may then be calculated utilizing Equation 3:

$$R(k) = 1 - \frac{N\_S(k)}{N(k)} \quad (3)$$

For some embodiments, if there is no DL encoder packet received over some interval (e.g., between $(k-1)*T$ and $k*T$), the PER for the previous frame $R(k-1)$ may be reported as the PER for the present frame $R(k)$. As described above, for H-ARQ transmissions, each encoder packet may be transmitted in multiple subpacket transmissions. However, the MS may be configured to count multiple subpacket transmissions as a single encoder packet when calculating a PER measurement. Accordingly, for H-ARQ transmissions, the encoder packet may be counted on the time interval when the last subpacket transmission occurs.

At 608, an average of the PER is calculated. Calculating an average PER may help, for example, generate an effective CINR value that adapts to varying BS signals. In some embodiments, exponential averaging may be used to lower the weight given to older statistics. The calculation of the exponential average of the DL encoder PER may be described by Equation 4, shown below, where k is the number of iterations and a is a constant representing an exponential average factor. The initial average PER value $A\_R(1)$ is equal to the PER value over the same interval $R(1)$, as the average of a set comprising a single entry is said entry itself.

$$A\_R(k) = a*R(k) + (1-a)*A\_R(k-1) \quad (4)$$

This average PER may be used to adjust the mapping of the physical CINR measurement to an effective CINR measurement. Various techniques may be used to dynamically adjust the mapping. For some embodiments, the physical CINR measurement may be adjusted by an adjustment factor selected based on the average PER.

For example, at 610, an adjustment factor, d(k), is calculated based on a comparison of the average PER to a target PER. This adjustment value, d(k), may be used to adjust the mapping at the end of each time interval T, based on the previously calculated average PER value A_R(k) and how it compares to a target error rate E. The adjustment value may be used, effectively, to adjust the physical CINR measurement as an index into a mapping table.

In some embodiments, the calculation of the adjustment value d(k) may be determined based on the results of comparing the average PER to the target PER, as shown in Equations-5-7.

$$d(k)=d(k-1)-D1, \text{ if } A\_R(k)>E \quad (5)$$

$$d(k)=d(k-1)+D2, \text{ if } A\_R(k)<E \quad (6)$$

$$d(k)=d(k-1), \text{ if } A\_R(k)=E \quad (7)$$

In other words, if the average PER exceeds the target, the adjustment factor d(k) may be generated by subtracting a first constant value D1 from the previous value d(k−1). If the average PER falls below the target, the adjustment factor d(k) may be generated by adding a second constant value D2 to the previous value d(k−1). If the average PER is at the target, the adjustment factor may be left unchanged. It should also be noted that initial values may be set such that the average PER will equal the first measured PER and the initial adjustment value d(0) may be set to zero.

Finally, at 612, the MS may calculate an effective CINR $CINR_{EFF}$ over the interval, between (k−1)*T and k*T, based on the physical CINR measurement $CINR_{PHY}$ and the previously calculated adjustment value d(k). The calculation of the effective CINR may be described by Equation 8, shown below, where k is the number of iterations (e.g., k=1, 2, 3, ... ). In practice, and d(1) equals zero. Note that P_CINR is in decibels dB for this calculation.

$$CINR_{EFF}=f(CINR_{PHY}+d(k)) \quad (8)$$

By adjusting the physical CINR value used as an index into a fixed mapping table, the mapping results achieved may be adjusted dynamically. In other words, as will be described below, given the same physical CINR measurement, different effective CINR values may be retrieved and reported, based on the value of d(k).

FIGS. 7A, 7B, 8A, and 8B illustrate an example this dynamic adjustment of the mapping of a physical CINR to an effective CINR in order to compensate for varying field conditions, according to embodiments of the present disclosure. Graph 710 of FIG. 7 illustrates example measured average packet error rates (712, 714 and 716) relative to a target PER 702.

Figure 7A:
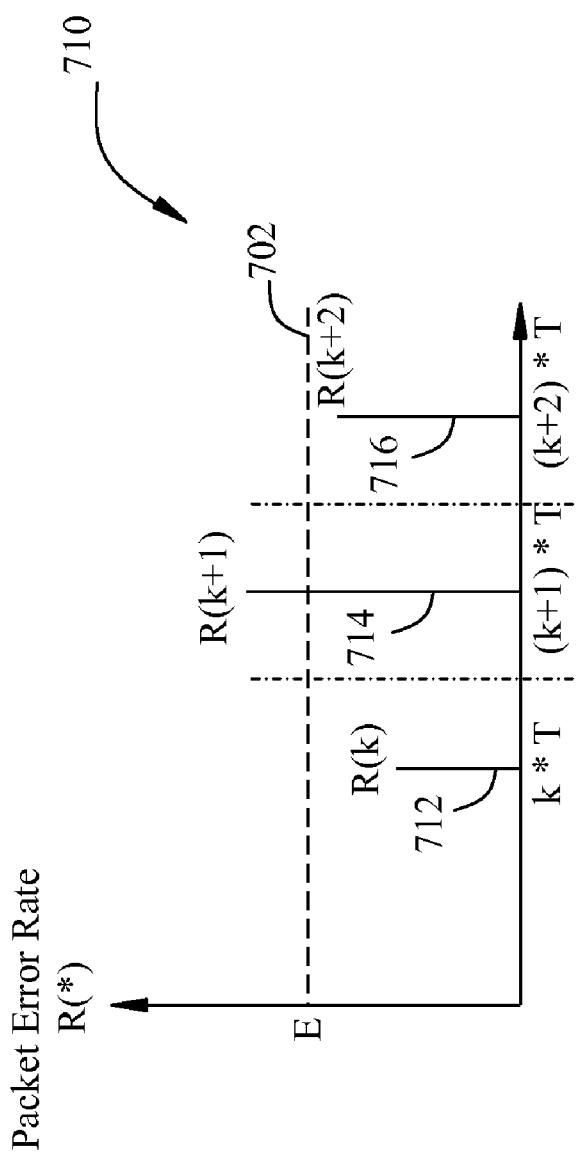
FIGS. 7A and 7B illustrate an example set of error rate conditions and a corresponding set of physical CINR adjustments, in accordance with embodiments of the present disclosure.
Figure 7B:
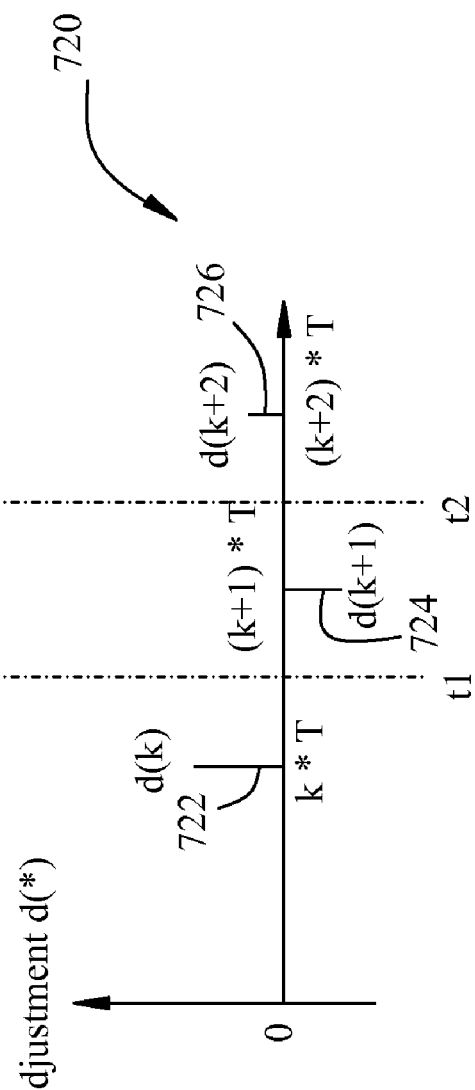

As the PER 712 taken at time k*T is less than the target packet error rate E, the MS may determine that a higher data rate may be possible. Accordingly, the MS may be able to increase the physical CINR adjustment factor, d(k) by D1, as shown in FIG. 7B. The effect of this adjustment is shown in FIG. 8A. Rather than using the measured physical CINR, the adjusted value $CINR_{PHY}+d(k)$ is used, resulting in the reporting of a higher effective CINR value (b2 rather than b1) at time t1. As a result, when a BS receives this higher effective CINR value, it may select a modulation scheme corresponding to a higher data rate, although this may result in a higher PER 714, as shown in FIG. 7A.

Referring back to FIG. 7A, as the PER 714 taken at time (k+1)*T is greater than the target packet error rate E, the MS may determine that a lower data rate may be necessary to bring the PER down below the target. Accordingly, the MS may be able to decrease the physical CINR adjustment factor, d(k) by D2, as shown in FIG. 7B. The effect of this (negative) adjustment is shown in FIG. 8B. Rather than using the measured physical CINR, the adjusted value $CINR_{PHY}+d(k)$, where d(k) is a negative value, is used, resulting in the reporting of a lower effective CINR value (b2) at time t2. In contrast, if the (unadjusted) physical CINR value were used, a higher effective CINR value (b3) would have been reported. This adjustment may result in the BS selecting a modulation scheme with a lower data rate, which may result in the average PER 716 again falling below the target at (k+2)*T, as shown in FIG. 7A.

Note that this example illustrates how subsequent adjustments may serve to bring the PER closer to the target packet error rate E. The process of dynamically adjusting the effective CINR reported to the BS may continue in an attempt to optimize data throughput and the corresponding packet error rate. As an optimal balance between data throughput and corresponding PERs is reached fewer adjustments may be necessary; however, as field conditions may change at any given time, the logic dynamically adjusting the effective CINR may remain active in order to promptly respond to any detrimental changes.

Figure 4A:
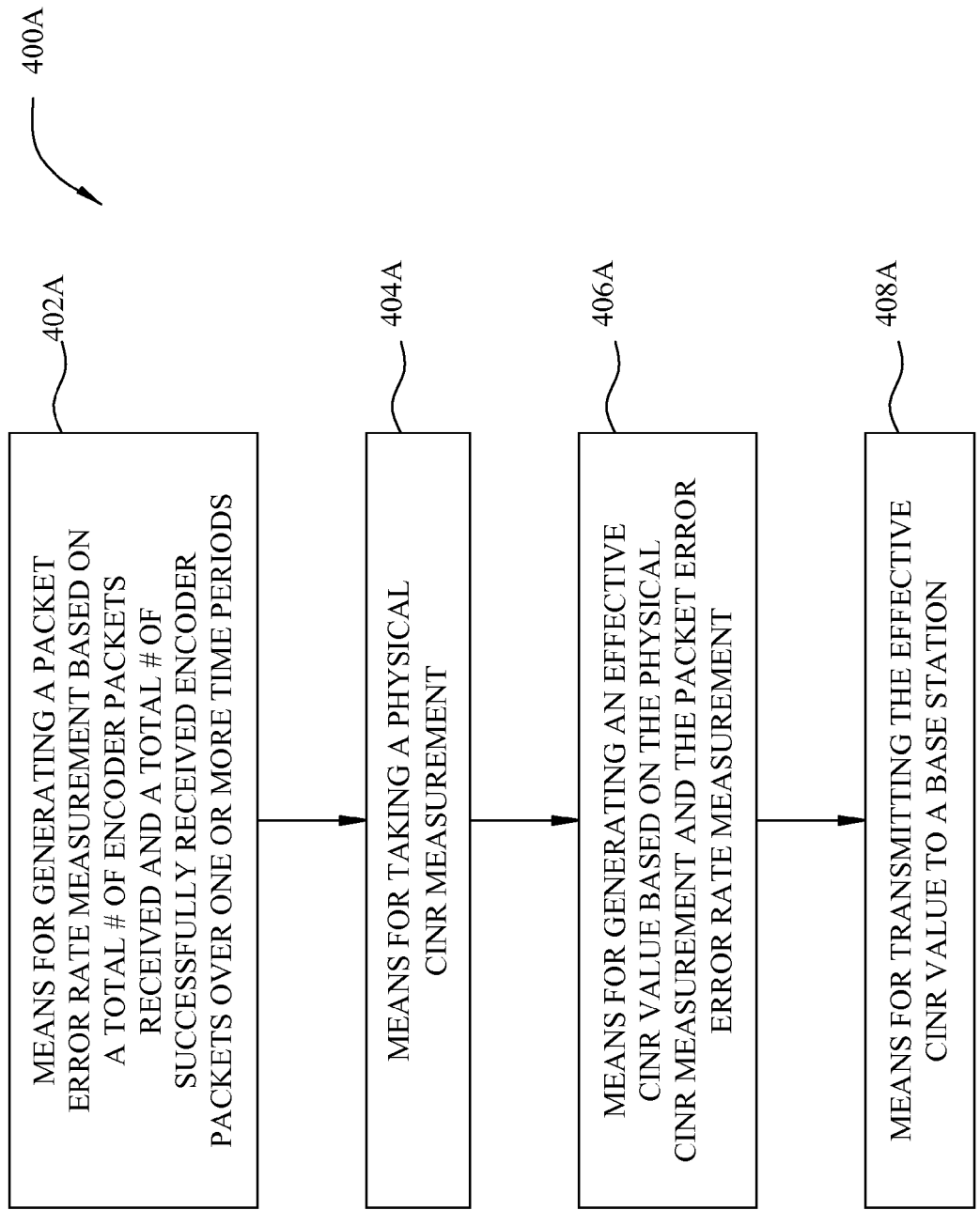
FIG. 4A is a block diagram of components corresponding to the example operations illustrated in FIG. 4.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 402-408 illustrated in FIG. 4 correspond to means-plus-function blocks 402A-408A illustrated in FIG. 4A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as instructions or one or more sets of instructions on a computer-readable medium or storage medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of dynamically adjusting an effective CINR reported back to a base station by a communication device, comprising:
    generating a packet error rate measurement based on a total number of received packets and a number of successfully received packets over one or more time periods;
    taking a physical CINR measurement;
    dynamically generating an effective CINR value as a function of the physical CINR measurement and an adjustment factor that is calculated based on the packet error rate measurement; and
    reporting the effective CINR value back to a serving base station.

2. The method of claim 1, wherein generating a packet error rate measurement comprises generating an average of multiple packet error rate measurements taken over different intervals.

3. The method of claim 2, wherein exponential averaging is used to generate the average of the multiple packet error rate measurements.

4. The method of claim 1, wherein generating an effective CINR value as a function of the physical CINR measurement and the packet error rate measurement comprises:
    retrieving a value for the effective CINR from a mapping table using, as an index, a value generated based on the physical CINR measured value and the adjustment factor.

5. The method of claim 1, comprising:
    generating the adjustment factor as a function of the packet error rate measurement and a previous value of an adjustment factor.

6. The method of claim 1, further comprising:
    comparing the packet error rate measurement to a target value; and
    generating the adjustment factor as a function of the comparison results.

7. The method of claim 1, wherein:
    the base station and communication device communicate via frames in accordance with one or more standards of the Institute of Electrical and Electronics Engineers (IEEE) 802.16 family of standards; and
    generating a packet error rate measurement comprises generating a packet error rate based on a total number of received packets and a number of successfully received packets over one or more time periods, wherein each time period corresponds to multiple frames; and
    reporting the effective CINR value back to a serving base station comprises reporting the CINR value back to the serving base station via a fast-feedback channel.

8. A mobile device for wireless communication configured to dynamically adjust an effective CINR reported back to a base station, comprising:
    at least one processor configured to:
        generate a packet error rate measurement based on a total number of received packets and a number of successfully received packets over one or more time periods;
        take a physical CINR measurement;
        dynamically generate an effective CINR value as a function of the physical CINR measurement and an adjustment factor that is calculated based on the packet error rate measurement; and
        report the effective CINR value back to a serving base station.

9. The mobile device of claim 8, wherein the at least one processor is further configured to generate an average of multiple packet error rate measurements taken over different intervals.

10. The mobile device of claim 8, wherein the at least one processor is further configured to retrieve a value for the effective CINR from a mapping table using, as an index, a value generated based on the physical CINR measured value and the adjustment factor.

11. The mobile device of claim 8, wherein the at least one processor is further configured to use exponential averaging to generate the average of the packet error rate measurements.

12. The mobile device of claim 8, wherein the at least one processor is further configured to:
generate the adjustment factor as a function of the packet error rate measurement and a previous value of an adjustment factor.

13. The mobile device of claim 8, wherein the at least one processor is further configured to:
compare the packet error rate measurement to a target value; and
generate the adjustment factor as a function of the comparison results.

14. The mobile device of claim 8, wherein:
the base station and the mobile device are configured to communicate via frames in accordance with one or more standards of the Institute of Electrical and Electronics Engineers (IEEE) 802.16 family of standards;
the at least one processor is further configured to generate a packet error rate based on a total number of received packets and a number of successfully received packets over one or more time periods, wherein each time period corresponds to multiple frames; and
the at least one processor is further configured to report the CINR value back to the serving base station via a fast-feedback channel.

15. An apparatus for wireless communication configured to dynamically adjust an effective CINR reported back to a base station, comprising:
means for decoding received signals and extracting a set of received packets;
means for generating a packet error rate measurement based on a total number of received packets and a number of successfully received packets over one or more time periods;
means for taking a physical CINR measurement;
means for dynamically generating an effective CINR value as a function of the physical CINR measurement and an adjustment factor that is calculated based on the packet error rate measurement; and
means for reporting the effective CINR value back to a serving base station.

16. The apparatus of claim 15, wherein the means for generating a packet error rate measurement comprises a means for generating an average of multiple packet error rate measurements taken over different intervals.

17. The apparatus of claim 15, wherein the means for generating an effective CINR value as a function of the physical CINR measurement and the packet error rate measurement is configured to retrieve a value for the effective CINR from a mapping table using, as an index, a value generated based on the physical CINR measured value and the adjustment factor.

18. The apparatus of claim 15, wherein exponential averaging is used to generate the average of the packet error rate measurements.

19. The apparatus of claim 15, comprising:
means for generating the adjustment factor as a function of the packet error rate measurement and a previous value of an adjustment factor.

20. The apparatus of claim 15, further comprising:
means for comparing the packet error rate measurement to a target value; and
means for generating the adjustment factor as a function of the comparison results.

21. The apparatus of claim 15, wherein:
the base station and communication device are configured to communicate via frames in accordance with one or more standards of the Institute of Electrical and Electronics Engineers (IEEE) 802.16 family of standards;
the means for generating a packet error rate measurement is configured to generate a packet error rate based on a total number of received packets and a number of successfully received packets over one or more time periods, wherein each time period corresponds to multiple OFDMA frames; and
the means for reporting the effective CINR value back to a serving base station is configured to report the CINR value back to the serving base station via a fast-feedback channel.

22. A computer readable storage medium having a program stored thereon, which, when executed by a processor, performs operations comprising:
generating a packet error rate measurement based on a total number of received packets and a number of successfully received packets over one or more time periods;
dynamically generating an effective CINR value as a function of a physical CINR measurement and an adjustment factor that is calculated based on the packet error rate measurement; and
reporting the effective CINR value back to a serving base station.

23. The computer readable storage medium of claim 22, wherein generating a packet error rate measurement comprises generating an average of multiple packet error rate measurements taken over different intervals.

24. The computer readable storage medium of claim 22, wherein generating an effective CINR value as a function of the physical CINR measurement and the packet error rate measurement comprises:
retrieving a value for the effective CINR from a mapping table using, as an index, a value generated based on the physical CINR measured value and the adjustment factor.

25. The computer readable storage medium of claim 22, wherein exponential averaging is used to generate the average of the packet error rate measurements.

26. The computer readable storage medium of claim 22, wherein the operations further comprise:
generating the adjustment factor as a function of the packet error rate measurement and a previous value of an adjustment factor.

27. The computer readable storage medium of claim 22, wherein the operations further comprise:
comparing the packet error rate measurement to a target value; and
generating the adjustment factor as a function of the comparison results.

28. The computer readable storage medium of claim 22, wherein:

the base station and communication device communicate via frames in accordance with one or more standards of the Institute of Electrical and Electronics Engineers (IEEE) 802.16 family of standards;

generating a packet error rate measurement comprises generating a packet error rate based on a total number of received packets and a number of successfully received packets over one or more time periods, wherein each time period corresponds to multiple OFDMA frames; and reporting the effective CINR value back to a serving base station comprises reporting the CINR value back to the serving base station via a fast-feedback channel.

* * * * *